United States Patent Office 3,281,360
Patented Oct. 25, 1966

3,281,360
ORGANIC SUBSTRATES CONTAINING SULFUR-
IZED PIPERAZINE STABILIZING DERIVATIVES
Gordon G. Knapp, Royal Oak, Mich., assignor to Ethyl
Corporation, New York, N.Y., a corporation of Virginia
No Drawing. Original application June 7, 1962, Ser. No.
200,625, now Patent No. 3,186,993, dated June 1, 1965.
Divided and this application Aug. 10, 1964, Ser. No.
388,703
6 Claims. (Cl. 252—47.5)

This application is a division of Serial No. 200,625 filed June 7, 1962, now U.S. Pat. No. 3,186,993.

This invention relates to a novel class of compounds, their preparation and their use as antioxidants. More particularly, it relates to a novel and unusual class of $\alpha,\alpha'$-(1,4-piperazinediyl)bis(3,5-dialkyl-4-hydroxythiobenzaldehyde) compounds, the methods for their preparation and the employment of these novel compounds as stabilizers and antioxidants for organic material.

In the past, benzyl amines have been suggested for use as antioxidants for various organic media. Their acceptance has been limited due to many and variable factors such as volatility, compatibility, solubility and others. Sulfur-containing compounds have also been suggested for use as antioxidants and their acceptance has also been hampered by compatibility factors. Further, in those areas where benzyl amines were found effective, sulfur-containing compounds were found to be ineffective or actually detrimental. Likewise, in those areas where sulfur-compounds have been found to be effective, amine compounds have found no utility. Clearly then a need exists for an effective antioxidant for use in both those areas in which benzyl amines have been found to be suitable and in which sulfur-containing compounds have been found to be suitable. Further, the antioxidant must be of a large enough molecular weight to be soluble and substantially non-volatile and also be easily prepared at low cost.

Accordingly, an object of this invention is to provide novel and useful chemical compounds. Another object is to provide novel and useful sulfur-containing benzyl amine type compounds which are easy to prepare, low in cost, have a high degree of solubility and have low volatility. A further object is to provide novel and useful $\alpha,\alpha'$-(1,4-piperazinediyl)bis(3,5-dialkyl-4-hydroxythiobenzaldehyde) compounds. Still another object is to provide processes for preparing the novel piperazine thiobenzaldehyde of this invention. A still further object is to provide improved compositions of matter containing the various compounds of this invention. A specific object is to provide lubricating oil stabilized against oxidative deterioration. Other important objects of this invention will be apparent from the following description.

The above and other objects are accomplished by provision of a compound having the formula:

(I) 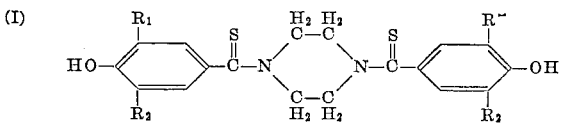

wherein $R_1$ and $R_2$ are selected from the group consisting of alkyl groups containing from 1–20 carbon atoms and aralkyl groups containing from 7–20 carbon atoms.

Examples of the compounds of this invention include:

$\alpha,\alpha'$-(1,4-piperazinediyl)bis[3-n-decyl-4-hydroxy-5-(1,1-dimethyl-n-tetradecyl)thiobenzaldehyde];
$\alpha,\alpha'$-(1,4-piperazinediyl)bis(3,5-diethyl-4-hydroxythiobenzaldehyde);
$\alpha,\alpha'$-(1,4-piperazinediyl)bis(4-hydroxy-3-n-propyl-5-p-n-tridecylbenzylthiobenzaldehyde);
$\alpha,\alpha'$-(1,4-piperazinediyl)bis(3,5-di-tert-butyl-4-hydroxythiobenzaldehyde);
$\alpha,\alpha'$-(1,4-piperazinediyl)bis(3,5-di-n-octyl-4-hydroxythiobenzaldehyde);
$\alpha,\alpha'$-(1,4-piperazinediyl)bis[3,5-di-($\alpha,\alpha$-methylbenzyl)-4-hydroxythiobenzaldehyde];
$\alpha,\alpha'$-(1,4-piperazinediyl)bis(3-benzyl-5-sec-butyl-4-hydroxythiobenzaldehyde);
$\alpha,\alpha'$-(1,4-piperazinediyl)bis(3,5-di-n-eicosyl-4-hydroxythiobenzaldehyde);
$\alpha,\alpha'$-(1,4-piperazinediyl)bis(3,5-dimethyl-4-hydroxythiobenzaldehyde); and
$\alpha,\alpha'$-(1,4-piperazinediyl)bis(3,5-di-$\alpha$-methylbenzyl-4-hydroxythiobenzaldehyde).

The compounds of this invention are water insoluble and non-polar. They range from white to yellow crystalline solids to viscous amber liquids. They are ashless and non-volatile facilitating their incorporation into a wide range of organic material.

A preferred embodiment of this invention consists of compounds of the above formula wherein $R_1$ is an alkyl group having from 1–12 carbon atoms and $R_2$ is an alpha-branched alkyl group having from 3–12 carbon atoms. These compounds are more effective antioxidants than other compounds within the scope of this invention. Among the compounds represented by this embodiment are:

$\alpha,\alpha'$-(1,4-piperazinediyl)bis(3,5-di-tert-butyl-4-hydroxythiobenzaldehyde);
$\alpha,\alpha'$-(1,4-piperazinediyl)bis[3-n-butyl-4-hydroxy-5-(1-methyl-n-pentyl)thiobenzaldehyde];
$\alpha,\alpha'$-(1,4-piperazinediyl)bis(4-hydroxy-3,5-diisopropyl-thiobenzaldehyde);
$\alpha,\alpha'$-(1,4-piperazinediyl)bis(3-tert-butyl-4-hydroxy-5-methylthiobenzaldehyde);
$\alpha,\alpha'$-(1,4-piperazinediyl)bis(4-hydroxy-3,5-di-n-pentyl-thiobenzaldehyde); and
$\alpha,\alpha'$-(1,4-piperazinediyl)bis(3-tert-butyl-5-ethyl-4-hydroxythiobenzaldehyde).

The most particularly preferred compound of this invention is $\alpha,\alpha'$-(1,4-piperazinediyl)bis(3,5-di-tert-butyl-4-hydroxythiobenzaldehyde). This compound is most particularly preferred because it has excellent antioxidant activity in lubricating oils and other organic media, to a greater extent than the other compounds of this invention.

The novel compounds of this invention can be prepared by two methods. In one embodiment of this invention the compounds are prepared by reacting a benzylpiperazine with sulfur. Thus, $\alpha,\alpha'$-(1,4-piperazinediyl)bis(3,5-di-tert-butyl-4-hydroxythiobenzaldehyde) is readily prepared by reacting α,α'-(1,4-piperazinediyl)bis(2,6-di-tert-butyl-p-cresol) with sulfur.

The above reaction can be illustrated by the following general equation:

(II)

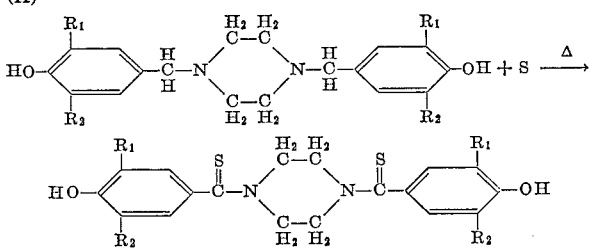

wherein $R_1$ and $R_2$ are as in Formula I.

The preparation of the α,α'-(1,4-piperazinediyl)bis(2,6-dialkyl-p-cresol) compounds is described in application Serial No. 200,624 filed June 7, 1962 and now U.S. Pat. No. 3,218,322, entitled "Piperazine Derivatives," the inventor being Harold D. Orloff. They can be prepared by reacting a 2,6-dialkylphenol with piperazine and formaldehyde. Thus, α,α'-(1,4-piperazinediyl)bis(2,6 - di - tert-butyl-p-cresol) can be prepared by reacting 2,6-di-tert-butyphenol with piperazine and formaldehyde.

The temperatures employed in the reaction of Equation II vary from about 100° C. to the reflux temperature of the reaction mixture, but no higher than about 300° C., at reaction times of from a few minutes to one week or more to give a good yield of product.

The preferred temperature range is from about 130° C. to about 220° C. At this temperature range the reaction proceeds smoothly, at a sufficiently rapid rate to give a good yield of product in a reasonable time with a minimum of undesirable side reactions.

In another embodiment of this invention the compounds are prepared by reacting a 3,5-dialkyl-4-hydroxybenzaldehyde, sulfur and piperazine. Thus, α,α'-(1,4-piperazinediyl)bis(3,5 - di-tert-butyl-4-hydroxythiobenzaldehyde) is readily prepared by reacting 3,5-di-tert-butyl-4-hydroxybenzaldehyde with sulfur and piperazine. This reaction can be illustrated by the following general equation:

(III)

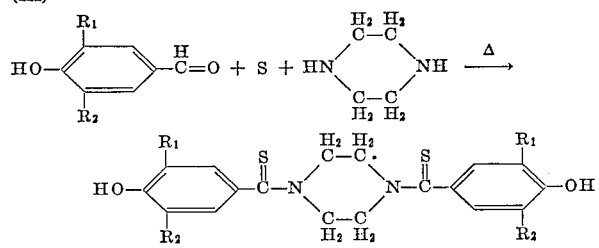

wherein $R_1$ and $R_2$ are as in Formula I.

The preparation of the 3,5-dialkyl-4-hydroxybenzaldehyde is described in now abandoned application S.N. 77,276 entitled "Stabilized Plastic" filed December 21, 1960, the inventors being Gordon G. Knapp and Calvin J. Worrel. They can be prepared by the bromination of the corresponding 2,6-dialkyl-2-cresol in the presence of alcohol with a subsequent hydrolysis of the brominated cresol. Thus, 3,5-di-tert-butyl - 4 - hydroxybenzaldehyde can be prepared by brominating 2,6-di-tert-butyl-p-cresol and subsequently hydrolyzing the brominated cresol.

The temperatures employed in practicing this embodiment vary from about 50° C. to the reflux temperature of the highest boiling reaction mixture, or about 300° C., at reaction times of from a few minutes to one week or more to give a good yield of product.

A preferred temperature range is from about 80° C. to 135° C. At this temperature range the reaction proceeds rapidly giving a high yield of product with a minimum of undesirable side reactions.

In both the above reactions, in order to insure complete utilization of the starting phenolic compound it is desirable to use an excess of sulfur. Furthermore, in order for the reaction to proceed more efficiently elevated pressure may be employed.

Both reactions may be conducted with or without the aid of a solvent. For most of the compounds it is preferred not to use a solvent due to the lack of solubility of free sulfur. However, for certain compounds a solvent may be desired where the phenolic compound is a high melting solid and not liquid at the reaction temperature. Such solvents are the higher boiling glycol ethers and alcohols such as ethylene glycol-mono-n-butyl ether, ethylene glycol-monophenyl ether, ethylene glycol-monobenzyl ether, n-hexyl alcohol, cyclohexanol, n-octyl alcohol, capryl alcohol, n-decyl alcohol, lauryl alcohol, cetyl alcohol, stearyl alcohol, benzyl alcohol, n-heptyl alcohol, n-nonyl alcohol, n-undecyl alcohol and n-dodecyl alcohol. When lower temperatures are desired other solvents may be used such as dioxane or pyridine.

In conducting the reaction of Equation III a convenient solvent is the piperazine reactant itself. When using piperazine as a solvent a convenient reaction temperature is the boiling point of piperazine, about 145° C. After the compounds have been formed they can be removed by any conventional means such as solvent extraction or filtration.

The molar ratio of sulfur to phenolic compounds in both the reactions of Equations II and III can be varied from about 1:1 to about 10:1 or more and still produce a good yield of compound. In general, it has been found that increasing the molar ratio of sulfur to phenolic compound beyond that of about 5:1 affords only slightly increased yields of compounds in relation to the amount of sulfur used. Thus, a preferred embodiment of this invention is the preparation of a highly effective antioxidant material by the reaction of Equation II or III wherein the molar ratio of sulfur to phenolic compounds is from about 1:1 to about 5:1.

An excellent yield of compound is obtained with a minimum amount of unreacted phenolic compound when the molar ratio of sulfur to phenolic compound is about 2:1. Thus, a particularly preferred embodiment of this invention is the preparation of a highly effective antioxidant material by the reaction of Equations II or III wherein the molar ratio of sulfur to phenolic compound is about 2:1.

It is to be noted that this invention is not restricted to the use of a molar ratio of sulfur to phenolic compound of about 1:1 or higher. On the contrary, although the yield is lower when the ratio is below 1:1, the compound is still produced.

The following examples in which all parts and percentages are by weight illustrate the compounds of this invention and their preparation according to the method outlined in Equation II.

*Example 1*

In a reaction vessel equipped with a stirrer, temperature measuring means and heating means were placed 26.1 parts of α,α' - (1,4 - piperazinediyl)bis(2,6-di-tert-butyl-p-cresol) and 5.6 parts of sulfur. The mixture was heated to 145° C.–155° C. for one hour and then allowed to cool to room temperature. The resultant material was then triturated with benzene. The benzene was evaporated and the residue was then triturated with n-hexane and filtered to yield an amorphous orange solid which was triturated with hot ethyl acetate to yield bright yellow α,α'-(1,4-piperazinediyl) bis (3,5-di-tert-butyl-4-hydroxythiobenzaldehyde), with a melting point of 270° C.

*Analysis.*—Calculated for $C_{34}H_{50}N_2O_2S_2$: 11.0 percent sulfur, 4.81 percent nitrogen. Found: 11.2 percent sulfur, 5.46 percent nitrogen.

The ethyl acetate triturate from the above reaction was concentrated and cooled to yield a small amount of yellow crystalline 3,5-di-tert-butyl-4-hydroxybenzyl-piperazine as a by-product, with a melting point of 197–199° C.

*Analysis.*—Calculated for $C_{19}H_{36}ON_2S$: 9.59 percent sulfur, 8.38 percent nitrogen. Found: 9.46 percent sulfur, 8.61 percent nitrogen.

*Example 2*

In a reaction vessel equipped with a stirrer, temperature measuring means and heating means are placed 261 parts of α,α′ - (1,4 - piperazinediyl) bis (2-tert-butyl-6-methyl-p-cresol) and 32 parts of sulfur in 500 parts of n-hexyl alcohol. The mixture is heated to 130° C. and kept at that temperature with stirring for one week. During this time a solid precipitates which is then filtered. This material is recrystallized from a 50 percent mixture of isooctane and ethanol to give α,α′-(1,4-piperazinediyl)bis(3-tert-butyl-5-methyl-4-hydroxythiobenzaldehyde).

Good results are also obtained when other benzylpiperazines are treated in the manner of the above example. For example, the reaction of α,α′-(1,4-piperazinediyl)bis(2,6-diethyl-p-cresol) with sulfur in ethylene glycol-mono-n-butyl ether yields α,α′-(1,4-piperazinediyl)bis(3,5-diethyl - 4 - hydroxythiobenzaldehyde). Likewise, α,α′ - (1,4-piperazinediyl)bis[2,6-di-(α,α - dimethylbenzyl-p-cresol] can be reacted with sulfur in n-decyl alcohol to produce α,α′-(1,4-piperazinediyl)bis[3,5-di-(α,α-dimethylbenzyl)-4-hydroxythiobenzaldehyde].

*Example 3*

In a reaction vessel equipped with heating means, a stirrer and temperature measuring means are placed 303 parts of α,α′-(1,4-piperazinediyl)bis(2,6-di-tert-butyl-p-cresol) and 64 parts of sulfur. The mixture is heated to 130° C. with stirring and maintained at that temperature for 8 hours. After cooling to room temperature the mixture is triturated with n-hexane. A precipitate is formed which is filtered and recrystallized from a 50 percent mixture of isooctane and ethanol to yield α,α′-(1,4-piperazinediyl)bis(3,5 - di - tert-butyl-4-hydroxythiobenzaldehyde).

Following the procedure in Example 3 good results are also obtained when α,α′-(1,4-piperazinediyl)bis[2-tert-butyl-6-(1-ethyl-n-decyl)-p-cresol] is reacted with sulfur to produce α,α′-(1,4-piperazinediyl)bis[3-tert-butyl-5-(1-ethyl - n - decyl)-4-hydroxythiobenzaldehyde]. Likewise, α,α′ - (1,4 - piperazinediyl)bis[2 - n-butyl-6-(1-methyl-n-pentyl)-p-cresol] can be reacted with sulfur to form α,α′-(1,4 - piperazinediyl)bis[3-n-butyl-5-(1-methyl-n-pentyl)-4-hydroxythiobenzaldehyde].

*Example 4*

In a pressure vessel equipped with venting means, heating means, a stirrer and temperature measuring means are placed 275 parts of α,α′-(1,4-piperazinediyl)bis(2,6-diisopropyl-p-cresol) and 16 parts of sulfur in 400 parts of capryl alcohol. The pressure vessel is sealed, heated to 150° C. and maintained at that temperature for 2 hours. After cooling to room temperature, the vessel is vented and the mixture filtered. A precipitate is obtained which is recrystallized from a 50 percent mixture of n-hexane and ethanol to yield α,α′-(1,4-piperazinediyl)bis-(3,5-diisopropyl-4-hydroxythiobenzaldehyde).

The above procedure can be used to obtain good results when reacting α,α′-(1,4-piperazinediyl)bis(2,6-diethyl-p-cresol) with sulfur to yield α,α′-(1,4-piperazinediyl)bis-(3,5-diethyl-4-hydroxythiobenzaldehyde). Likewise, α,α′-(1,4 - piperazinediyl)bis(2 - tert-butyl-6-methyl-p-cresol) can be reacted with sulfur to produce α,α′-(1,4-piperazinediyl)bis(3 - tert - butyl-5-methyl-4-hydroxythiobenzaldehyde).

*Example 5*

To a reaction vessel equipped with heating means, a stirrer and temperature measuring means are added 351 parts of α,α′-(1,4- piperazinediyl)bis(2,6-di-tert-butyl-p-cresol) and 160 parts of sulfur. The mixture is heated to 220° C. and kept at that temperature with stirring for ½ hour. The mixture is then cooled to room temperature and triturated with n-hexane. A precipitate is formed which is filtered and recrystallized from a 50 percent mixture of n-hexane and ethanol to yield α,α′-(1,4-piperazinediyl)bis(3,5-di-tert-butyl-4-hydroxythiobenzaldehyde).

Good results are also obtained when α,α′-(1,4-piperazinediyl)bis(2 - tert - butyl-6-methyl-p-cresol) is reacted with sulfur in the above manner to yield α,α′-(1,4-piperazinediyl)bis(3 - tert-butyl-5-methyl-4-hydroxythiobenzaldehyde). Likewise, α,α′-(1,4-piperazinediyl)bis[2,6-di-(α-methylbenzyl)-p-cresol] can be reacted with sulfur to produce α,α′ - (1,4 - piperazinediyl)bis[3,5-di-(α-methylbenzyl)-4-hydroxythiobenzaldehyde].

*Example 6*

In a pressure vessel equipped with venting means, heating means, a stirrer and temperature measuring means are added 662 parts of α,α′-(1,4-piperazinediyl)bis[2-n-decyl - 6 - (1,1-dimethyl-n-tetra-decyl)-p-cresol] and 256 parts of sulfur. The pressure vessel is sealed and heated to a temperature of 300° C. for 5 minutes. It is then allowed to cool to room temperature and vented. Upon trituration with n-hexane a solid precipitates from the mixture. This solid is filtered and recrystallized from a 50 percent mixture of n-hexane and ethanol to yield α,α′ - (1,4-piperazinediyl)bis[3-n-decyl-4-hydroxy-5-(1,1-dimethyl-n-tetradecyl)thiobenzaldehyde].

Good results are also obtained when other benzylpiperazines are reacted in the above manner. Thus, α,α′-(1,4-piperazinediyl)bis(2,6-di-n-octyl-p-cresol) can be reacted with sulfur to produce α,α′-(1,4-piperazinediyl)bis(3,5-di-n-octyl-4-hydroxythiobenzaldehyde). Likewise, α,α′-(1,4-piperazinediyl)bis(2,6 - di - tert - butyl-p-cresol) can be reacted with sulfur to produce α,α′-(1,4-piperazinediyl)-bis(3,5-di-tert-butyl-4-hydroxythiobenzaldehyde).

*Example 7*

In a reaction vessel equipped with heating means, a stirrer, temperature measuring means and a reflux condenser are placed 477 parts of α,α′-(1,4-piperazinediyl)-bis(2 - n - propyl-6-p-n-tridecylbenzyl-p-cresol) and 320 parts of sulfur. The reaction mixture is refluxed for 2 days, cooled to room temperature and triturated with n-hexane. A solid precipitates which is filtered and recrystallized from a 50 percent mixture of isooctane and ethanol to yield α,α′-(1,4-piperazinediyl)bis(4-hydroxy-3-n-propyl-5-p-n-tridecylbenzylthiobenzaldehyde).

Good results are also obtained when α,α′-(1,4-piperazinediyl)bis(2 - tert - butyl-6-methyl-p-cresol) is reacted with sulfur in the above manner to produce α,α′-(1,4-piperazinediyl)bis(3 - tert - butyl-4-hydroxy-5-methylthiobenzaldehyde).

The following examples, in which all parts and percentages are by weight, illustrate the compounds of this invention and their preparation according to the method outlined in Equation III.

*Example 8*

In a reaction vessel equipped with heating means, a stirrer and temperature measuring means are placed 10.0 parts of 3,5-di-tert-butyl-4-hydroxybenzaldehyde, 3.4 parts of sulfur and 5.0 parts of piperazine. The mixture is refluxed for 3 hours. The reaction mixture is then allowed to cool, dissolved in chloroform, washed in sequence with water, dilute sodium bicarbonate, dilue hydrochloric acid and finally water, dried and evaporated at room temperature to yield α,α′-(1,4-piperazinediyl)bis-(3,5-di-tert-butyl-4-hydroxythiobenzaldehyde).

*Example 9*

In a reaction vessel equipped with heating means, a stirrer and temperature measuring means are placed 343 parts of 3,5-di-(α,α-dimethylbenzyl)-4-hydroxybenzaldehyde, 104 parts of piperazine and 32 parts of sulfur in 1000 parts of dioxane. The mixture is heated to 50° C. and maintained at that temperature for one week. The solvent is removed under reduced pressure and the resulting residue is taken up in a 50 percent mixture of hot ethanol and isooctane, filtered and cooled to yield α,α'-(1,4 - piperazinediyl)bis[3,5 - di(α,α - dimethylbenzyl)-4-hydroxythiobenzaldehyde].

Good results are also obtained when other benzaldehydes are reacted with piperazine and sulfur in a similar manner. Thus, 3,5-diisopropyl - 4 - hydroxybenzaldehyde can be reacted with piperazine and sulfur in lauryl alcohol to produce α,α'-(1,4-piperazinediyl)bis(3,5 - diisopropyl - 4 - hydroxythiobenzaldehyde). Likewise, 3,5-diethyl - 4 - hydroxybenzaldehyde can be reacted with piperazine and sulfur in benzyl alcohol to produce α,α'-(1,4 - piperazinediyl)bis(3,5 - diethyl - 4 - hydroxythiobenzaldehyde). Also, 3 - ethyl - 5 - tert - butyl - 4 - hydroxybenzaldehyde can be reacted with piperazine and sulfur in cetyl alcohol to produce α,α'-(1,4-piperazinediyl)bis(3-ethyl-5-tert-butyl-4-hydroxythiobenzaldehyde).

*Example 10*

In a reaction vessel equipped with heating means, a stirrer and temperature measuring means are placed 241 parts of 3,5-di-n-eicosyl-4-hydroxybenzaldehyde, 50 parts of piperazine and 64 parts of sulfur in 500 parts of pyridine. The mixture is heated to 80° C. and maintained at that temperature for 3 hours. After cooling to room temperature the mixture is triturated with n-hexane. A solid is precipitated which is filtered and recrystallized from a 50 percent mixture of n-hexane and ethanol to yield α,α'-(1,4-piperazinediyl)bis(3,5 - di - n - eicosyl - 4 - hydroxythiobenzaldehyde).

Further, good results are obtained when 3,5-di-sec-butyl-4-hydroxybenzaldehyde is reacted with piperazine and sulfur in stearyl alcohol to yield α,α'-(1,4-piperazinediyl)bis(3,5-di-sec-butyl - 4 - hydroxythiobenzaldehyde). Likewise, 3-n-butyl-4-hydroxy - 5 - (1-methyl-n-pentyl)benzaldehyde can be reacted with piperazine and sulfur in ethylene glycol-monobenzyl ether to yield α,α'-(1,4-piperazinediyl)bis[3-n-butyl - 4 - hydroxy - 5 - (1 - methyl-n-pentyl)-thiobenzaldehyde].

*Example 11*

In a pressure vessel equipped with venting means, heating means, a stirrer and temperature measuring means are placed 482 parts of 3,5-di-n-dodecyl - 4 - hydroxybenzaldehyde, 87 parts of piperazine and 32 parts of sulfur in 1000 parts of octanol. The pressure vessel is sealed, heated to 100° C. and kept at that temperature for 1 hour. It is then cooled to room temperature and vented. A precipitate is formed which is filtered and recrystallized from a 50 percent mixture of isooctane and ethanol to yield α,α'-(1,4-piperazinediyl)bis(3,5-di-n-dodecyl - 4 - hydroxythiobenzaldehyde).

The above procedure can be used to produce other excellent antioxidant compounds. Thus, 3 - benzyl - 5-sec-butyl - 4 - hydroxybenzaldehyde can be reacted with piperazine and sulfur in n-nonyl alcohol to produce α,α'-(1,4 - piperazinediyl)bis(3 - benzyl-5-sec - butyl - 4 - hydroxythiobenzaldehyde). Likewise, 3,5-di-tert - amyl - 4-hydroxybenzaldehyde can be reacted with piperazine and sulfur in ethylene glycol-monophenyl ether to produce α,α' - (1,4 - piperazinediyl)bis(3,5 - di - tert-amyl-4-hydroxythiobenzaldehyde).

*Example 12*

In a reaction vessel equipped with a stirrer, heating means and temperature measuring means are placed 191 parts of 3-tert-butyl-4-hydroxy-5-ethylbenzaldehyde, 300 parts of piperazine and 160 parts of sulfur. The reaction mixture is heated to 135° C. and kept at that temperature for ½ hour. During this time a solid precipitates which is filtered and recrystallized from a 50 percent mixture of n-hexane and ethanol to yield α,α'-(1,4-piperazinedid)bis(3 - tert-butyl-4-hydroxy - 5 - ethylthiobenzaldehyde).

Further, good results are also obtained in following the above procedure when reacting 3-methyl-5-tert-octyl-4-hydroxybenzaldehyde with sulfur in a molar excess of piperazine to produce α,α'-(1,4 - piperazinediyl)bis(3-methyl-5-tert-octyl-4-hydroxythiobenzaldehyde).

*Example 13*

In a pressure vessel equipped with venting means, heating means, a stirrer and temperature measuring means are placed 261 parts of 4-hydroxy - 3,5 - di-n-pentylbenzaldehyde, 77 parts of piperazine and 256 parts of sulfur. The pressure vessel is sealed and heated to 300° C. for 5 minutes after which it is allowed to cool and then vented. The mixture is then triturated with n-hexane. A solid precipitates which is filtered and recrystallized from a 50 percent mixture of n-hexane and ethanol to yield α,α'-(1,4-piperazinediyl)bis(4-hydroxy - 3,5 - di-n-pentylthiobenzaldehyde).

Good results are also obtained when the above procedure is followed in reacting 3-ethyl-4-hydroxy-5-isopropylbenzaldehyde with piperazine and sulfur to yield α,α'-(1,4-piperazinediyl)bis(3-ethyl-4-hydroxy - 5 - isopropylthiobenzaldehyde).

*Example 14*

In a reaction vessel equipped with heating means, a stirrer, temperature measuring means and a reflux condenser are placed 261 parts of 4-hydroxy-3-isopropyl-5-methylbenzaldehyde, 57 parts of piperazine and 320 parts of sulfur. The mixture is refluxed for 3 days. It is then cooled and triturated with n-hexane. A solid precipitates which is filtered and recrystallized from a 50 percent mixture of isooctane and ethanol to yield α,α'-(1,4-piperazinediyl)bis(4-hydroxy - 3 - isopropyl - 5 - methylthiobenzaldehyde).

Good results are also obtained when other benzaldehydes are reacted with piperazine and sulfur. Thus, 4-hydroxy-3-methyl-5-tert-octylbenzaldehyde can be reacted with piperazine and sulfur to yield α,α'-(1,4-piperazinediyl)bis(4-hydroxy-3-methyl - 5 - tert-octylthiobenzaldehyde).

The compounds of this invention are outstanding antioxidants. Therefore, an embodiment of this invention is a new composition of matter which comprises organic material normally tending to undergo oxidative deterioration in the presence of air, oxygen, or ozone containing an appropriate quantity—from 0.001 up to about 5 percent, and preferably from about 0.10 to about 2 percent—of a compound of this invention.

The compounds of this invention find important utility as antioxidants in a wide variety of oxygen-sensitive material. Thus, liquid hydrocarbon fuel such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils, waxes, soaps and greases, plastics, synthetic polymers such as polyethylene and polypropylene, organometallic compositions such as tetraethyllead and tetraethyllead antiknock fluids, elastomers (including natural rubber), crankcase lubricating oils, lubricating greases, and the like, greatly increase their resistance to deterioration in the presence of air, oxygen or ozone.

The compounds of this invention are very useful in protecting petroleum wax—paraffin wax and micro-crystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus, one embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

The compounds of this invention are also useful in preventing oxidative deterioration in lubricating oil compositions. Thus, a preferred embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperature.

The finished lubricants of this invention have much greater oxidation stability and many other improved performance characteristics as compared with the corresponding base oils. The following examples illustrate the preferred lubricating oil compositions of this invention.

To show the useful properties of the novel compounds of this invention, recourse is had to the Polyveriform Oxidation Stability Test as described in the paper entitled "Factors Causing Lubricating Oil Deterioration in Engines" [Ind. and Eng. Chem., Anal. Ed. 17, 302 (1945)]. See also "A Bearing Corrosion Test for Lubricating Oils and Its Correlation With Engine Performance" [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidative deterioration is achieved.

Comparative tests were conducted using the method and apparatus essentially as described in the publication first mentioned above. One minor modification was that the steel sleeve and copper test piece described in this publication were omitted from the apparatus. In these tests an initially additive-free 95 V.I. solvent refined SAE–10 crankcase oil was used. The principal test conditions consisted of passing 50 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of the oil employed.

Lubricating oils of this invention were prepared by blending 1 percent by weight of α,α'-(1,4-piperazinediyl) bis(3,5-di-tert-butyl-4-hydroxythiobenzaldehyde) with the oil described above. These compositions were compared in the Polyveriform Test with a sample of the oil not containing the antioxidant. Whereas during the test the oil containing no antioxidant increased in acid number to 12.3 and showed an increase in viscosity of 184 percent, the sample containing α,α'-(1,4-piperazinediyl) bis (3,5-di-tert-butyl-4-hydroxythiobenzaldyhde) showed an acid number of only 3.6 and an increase in viscosity of only 40 percent thus showing a definite improvement over the base oil.

Example 15

To 1,000 parts of a solvent refined neutral oil (95 V.I. and 200 SUS at 100° F.) containing 6 percent of a commercial methacrylate type V.I. approver which gives the finished formulation of a V.I. of 140 and a viscosity of 300 SUS at 100° F. is added 5 percent of α,α'-(1,4-piperazinediyl) bis (3,5-di-tert - butyl - 4 - hydroxythiobenzaldehyde).

Example 16

To an additive-free solvent refined crankcase lubricating oil having a viscosity index of 95 and an SAE viscosity of 10 is added 0.001 percent of α,α'-(1,4-piperazinediyl) bis (3-hexyl-5-isopropyl-4-hydroxythiobenzaldehyde).

Example 17

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of α,α'-(1,4-piperazinediyl) bis [3-(2-ethyldecyl)-5-N-dodecyl - 4 - hydroxythiobenzaldehyde)]. The resulting oil possesses greatly enhanced resistance to oxidative deterioration.

Example 18

To 100,000 parts of a commercially available pentaerythritol ester having a viscosity at 100° F. of 22.4 centistokes, and known in the trade as "Hercoflex 600" is added 400 parts (0.4 percent) of α,α'-(1,4-piperazinediyl) bis (3-tert-butyl-5-methyl - 4 - hydroxythiobenzaldehyde). The resulting finished oil possesses markedly improved resistance against oxidative deterioration.

Example 19

To 100,000 parts of dioctyl sebacate having a viscosity of 210° F. of 36.7 SUS, a viscosity index of 159 and a molecular weight of 426.7 is added 250 parts (0.25 percent) of α,α'-(1,4-piperazinediyl) bis [3-(2-methylhepyl)-5-N-nonyl-4-hydroxythiobenzaldehyde].

The compounds of this invention are also useful as additives to functional fluids and automatic transmission fluids. The primary constituent of a functional fluid is a refined mineral lubricating oil having carefully selected minimum viscosity of 49 Saybolt Universal Seconds SUS at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of capryl or octyl esters of salicylic acid, the alkaline-earth metal salts of petroleum sulfonic acids, the alkaline-earth metals salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together while heating the oil to a temperature up to 200° F.

*Example 20*

A fluid of this invention is prepared by blending 80 parts of a conventionally-refined Pennsylvania mineral oil (99 SUS at 100° F.), 2 parts of α,α'-(1,4-piperazinediyl) bis(3,5-diisopropyl-4-hydroxythiobenzaldehyde), 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity at 60/60° F. of 0.919.

*Example 21*

Another such fluid consists of 95 parts of a solvent-refined, light acid-treated, clay-contacted, solvent dewaxed paraffin base distillate mineral oil (110 SUS at 100° F.), 0.1 part of α,α'-(1,4-piperazinediyl)bis[3,5 - di - (ethyl-octyl)-4-hydroxythiobenzaldehyde], 0.1 part of calcium octyl phenol sulfide, 2 parts of a sulfurized sperm oil having a sulfur content between 10–12 percent, a viscosity of 210° F. of 200 SUS and a pour point of 65° F., 0.3 part of an ester of an aromatic acid and wax-alkylated phenol having a molecular weight of approximately 450: 2.5 parts of a linear pale color isobutylene polymer of a controlled molecular weight having a viscosity of 3,000 SUS at 210° F., a specific gravity of 60/60° F. of 0.875.

Liquid hydrocarbon fuels employed in the operation of spark ignition combustion engines are also vastly improved in their storage stability by the practice of this invention. The following examples illustrate compositions of typical commercial gasolines which may be stabilized against oxidative deterioration by the inclusion therein of a compound of this invention.

*Example 22*

To 1,000 parts of a gasoline containing 26.6 percent aromatics, 20.8 percent olefins, 52.6 percent saturates, and an API gravity of 62.1° is added 10 parts of α,α'-(1,4-piperazinediyl)bis(3-isopropyl - 5 - methyl-4-hydroxythiobenzaldehyde).

*Example 23*

To 10,000 parts of a gasoline containing 8.6 percent aromatics, 7.9 percent olefins, 83.5 percent saturates and an API gravity of 68.5° is added 500 parts of α,α'-(1,4-piperazinediyl)bis(3-n-amyl-5-tert-amyl - 4 - hydroxythiobenzaldehyde).

As noted in the preceding examples, the compounds of this invention are excellent antioxidants. This ability to prevent oxidation and deterioration of organic media is completely unexpected since seemingly similar compounds show little or no such antioxidant activity.

While the piperazine group of Formula I has been described without substituents attached thereto, it is to be understood that this invention is not restricted to those compounds which are only unsubstituted on the piperazine but extends also to those compounds where the piperazine group has substituents such as alkyl, aryl, cycloalkyl, aralkyl, halogen and nitro groups.

I claim:
1. Organic material normally tending to undergo oxidative deterioration containing a small antioxidant quantity, up to 5 percent of a compound having the formula:

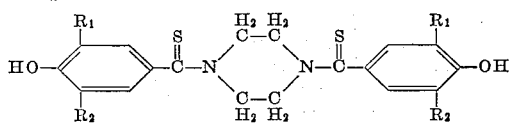

wherein $R_1$ and $R_2$ are selected from the group consisting of alkyl groups containing from 1–20 carbon atoms and aralkyl groups containing from 7–20 carbon atoms.

2. Lubricating oil containing α,α'-(1,4-piperazinediyl) bis(3,5-di-tert-butyl-4-hydroxythiobenzaldehyde).

3. The composition of claim 1 wherein said organic material is a functional fluid.

4. The composition of claim 1 wherein said organic material is gasoline.

5. The composition of claim 1, wherein said organic material is rubber.

6. The composition of claim 5 wherein said compound is α,α'-(1,4-piperazinediyl)bis(3,5-di-tert-butyl-4-hydroxythiobenzaldehyde).

References Cited by the Examiner

UNITED STATES PATENTS

| | | | |
|---|---|---|---|
| 2,870,152 | 1/1959 | Shusteritz | 260—268 |
| 3,000,892 | 9/1961 | Janssen | 260—268 |
| 3,004,035 | 10/1961 | Csendes | 260—800 |
| 3,081,335 | 3/1963 | Morris et al. | 252—47.5 |
| 3,209,001 | 9/1965 | Csendes | 260—45.8 |

DANIEL E. WYMAN, *Primary Examiner.*

L. G. XIARHOS, *Assistant Examiner.*

UNITED STATES PATENT OFFICE
CERTIFICATE OF CORRECTION

Patent No. 3,281,360            October 25, 1966

Gordon G. Knapp

It is hereby certified that error appears in the above numbered patent requiring correction and that the said Letters Patent should read as corrected below.

Column 1, formula (I), for that portion reading "R⁻" read -- $R_1$ --; column 3, line 61, for "2,6-dialkyl-2-cresol" read -- 2,6-dialkyl-p-cresol --; column 5, line 22, after "dimethylbenzyl" insert a closing parenthesis; column 7, line 10, after "hydroxythiobenzaldehyde" insert a closing parenthesis; lines 72 and 73, for "piperazinedid" read -- piperazinediyl --.

Signed and sealed this 5th day of September 1967.

(SEAL)
Attest:

ERNEST W. SWIDER            EDWARD J. BRENNER
Attesting Officer            Commissioner of Patents